United States Patent
Jagnnathan et al.

(10) Patent No.: US 11,668,684 B2
(45) Date of Patent: Jun. 6, 2023

(54) STOCHASTIC REALIZATION OF PARAMETER INVERSION IN PHYSICS-BASED EMPIRICAL MODELS

(71) Applicant: Landmark Graphics Corporation, Houston, TX (US)

(72) Inventors: Srinivasan Jagnnathan, Houston, TX (US); Oluwatosin Ogundare, Katy, TX (US); Srinath Madasu, Houston, TX (US); Keshava Rangarajan, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 252 days.

(21) Appl. No.: 16/956,605

(22) PCT Filed: Jul. 23, 2019

(86) PCT No.: PCT/US2019/043033
§ 371 (c)(1),
(2) Date: Jun. 21, 2020

(87) PCT Pub. No.: WO2021/015740
PCT Pub. Date: Jan. 28, 2021

(65) Prior Publication Data
US 2021/0164944 A1    Jun. 3, 2021

(51) Int. Cl.
*G01N 29/44* (2006.01)
*G06N 3/047* (2023.01)

(52) U.S. Cl.
CPC ..... *G01N 29/4472* (2013.01); *G01N 29/4481* (2013.01); *G06N 3/047* (2023.01); *G01N 2291/2634* (2013.01)

(58) Field of Classification Search
CPC .......... G01N 29/4472; G01N 29/4481; G01N 2291/2634; G01N 29/032; G06N 3/0472;
(Continued)

(56) References Cited

U.S. PATENT DOCUMENTS 9,261,484 B1 * 2/2016 Juan ................. G01N 29/032
9,977,075 B1 * 5/2018 Connor ............. G01R 31/287
(Continued)

FOREIGN PATENT DOCUMENTS

CN    102316919 A  *  1/2012  ............. A61B 5/087
CN    107423707 A  *  12/2017  ......... G06K 9/00281
(Continued)

OTHER PUBLICATIONS

Fangshu Yang "Deep-learning inversion: A next-generation seismic velocity model building method" vol. 84, issue 4 (Year: 2019).*
(Continued)

*Primary Examiner* — Michael J Dalbo
*Assistant Examiner* — Kaleria Knox
(74) *Attorney, Agent, or Firm* — Kilpatrick Townsend & Stockton LLP (57) ABSTRACT

Methods and systems for solving inverse problems arising in systems described by a physics-based forward propagation model use a Bayesian approach to model the uncertainty in the realization of model parameters. A Generative Adversarial Network ("GAN") architecture along with heuristics and statistical learning is used. This results in a more reliable point estimate of the desired model parameters. In some embodiments, the disclosed methodology may be applied to automatic inversion of physics-based modeling of pipelines.

20 Claims, 6 Drawing Sheets

(58) Field of Classification Search
CPC .......... G06N 3/08; G06N 3/04; G06N 7/005; G01V 1/42; G01V 1/44; G01B 17/02; G05B 13/048; G01F 1/7082; G01R 31/287
See application file for complete search history.

(56) References Cited

U.S. PATENT DOCUMENTS

| | | | | |
|---|---|---|---|---|
| 2007/0193357 | A1* | 8/2007 | Daaland | G01B 17/02 73/628 |
| 2008/0103747 | A1* | 5/2008 | Macharia | G05B 13/048 703/11 |
| 2010/0185422 | A1 | 7/2010 | Hoversten | |
| 2012/0080197 | A1 | 4/2012 | Ciucivara et al. | |
| 2014/0358503 | A1 | 12/2014 | Dickens et al. | |
| 2015/0107371 | A1* | 4/2015 | Khrakovsky | G01F 1/7082 73/861.28 |
| 2015/0285705 | A1* | 10/2015 | Kumar | G01M 5/0033 356/73.1 |
| 2018/0149019 | A1* | 5/2018 | Bose | G01V 1/44 |
| 2019/0049612 | A1* | 2/2019 | Padhi | G01V 1/42 |
| 2020/0125953 | A1* | 4/2020 | Yoo | G06N 7/005 |
| 2021/0027144 | A1* | 1/2021 | Madasu | G06N 3/04 |

FOREIGN PATENT DOCUMENTS

| | | | | |
|---|---|---|---|---|
| CN | 109978138 | A | * 7/2019 | ............ G06F 30/23 |
| KR | 101577733 | B1 | * 12/2015 | |
| WO | 2009020715 | A2 | 2/2009 | |
| WO | 2015016990 | A1 | 2/2015 | |

OTHER PUBLICATIONS

Ji-Hoon Bae, Doyeob Yeo, Doo-Byung Yoon, Se Won Oh, "Deep-Learning—Based Pipe Leak Detection Using Image-Basede Leak Features" Publisher IEEE, p. 2361-2365 (Year: 2018).*

International Search Report and Written Opinion for PCT application PCT/US2019/043033 dated Apr. 21, 2020, 7 pages.

Richardson, Alan; "Seismic Full-Waveform Inversion Using Deep Learning Tools and Techniques"; Physics.geo-ph; Feb. 1, 2018; 18 pages.

"Tomography: a Deep Learning vs Full Wave-Form Inversion Comparison"; Research Gate, Conference Paper; Sep. 2018; 5 pages, http://www.researchgate.net/publication/327832474.

* cited by examiner

STOCHASTIC REALIZATION OF PARAMETER INVERSION IN PHYSICS-BASED EMPIRICAL MODELS

TECHNICAL FIELD

The exemplary embodiments disclosed herein relate generally to the field of modeling pipelines and particularly to methods and systems for stochastic realization of parameters in inversion of physics-based empirical models of such pipelines.

BACKGROUND

In the oil and gas industry, pipeline systems are used to transport hydrocarbons and other liquid or gaseous materials. To understand the state of a pipeline, it is desirable to detect problems such as obstructions, deposits, corrosion, or undesired flows due to leaks that may be present in the pipeline. It may also be desirable to discriminate between different types of problems, such as leaks from different types of materials, for instance, oil, gas or water leaks. It may also be desirable to quantify the problem, such as the rate of a leak.

One way to analyze the condition of a pipeline is through the use of acoustic signals. In this technique, an acoustic source is used to generate an acoustic signal, or wave, in a section of the pipeline. The signal then propagates through the pipeline and is subsequently reflected by obstructions, deposits or other items or defects in the pipeline. The reflected signal is then detected and analyzed to determine the condition of the pipeline.

Analyzing these acoustic signals often involves application of computationally intensive machine learning (ML) algorithms to models of the pipeline. Conventional ML algorithms, however, often require a large number of iterations for the model outputs to converge to some estimate of the desired model parameters for which the model matches a set of observed values. Accordingly, a need exists for improved methods and systems for use in the computer modeling, particularly as applied to pipeline systems.

BRIEF DESCRIPTION OF THE DRAWINGS

For a more complete understanding of the exemplary disclosed embodiments, and for further advantages thereof, reference is now made to the following description taken in conjunction with the accompanying drawings in which.

DESCRIPTION OF EXEMPLARY EMBODIMENTS

The following discussion is presented to enable a person skilled in the art to make and use the exemplary disclosed embodiments. Various modifications will be readily apparent to those skilled in the art, and the general principles described herein may be applied to embodiments and applications other than those detailed below without departing from the spirit and scope of the disclosed embodiments as defined herein. Accordingly, the disclosed embodiments are not intended to be limited to the particular embodiments shown, but are to be accorded the widest scope consistent with the principles and features disclosed herein.

At a high level, embodiments of the disclosure provide methods and systems for solving inversion problems arising in physical systems that can be described by a physics-based forward propagation model, or forward model. As will be discussed, the embodiments employ a Bayesian approach to modeling uncertainty in the realizations of the model parameters. These embodiments can further employ a Generative Adversarial Network ("GAN") along with statistical learning to achieve a more reliable point estimate of the desired model parameters. The above arrangement is particularly applicable to automatic inversion of physics-based forward models of pipeline systems.

Figure 1A:
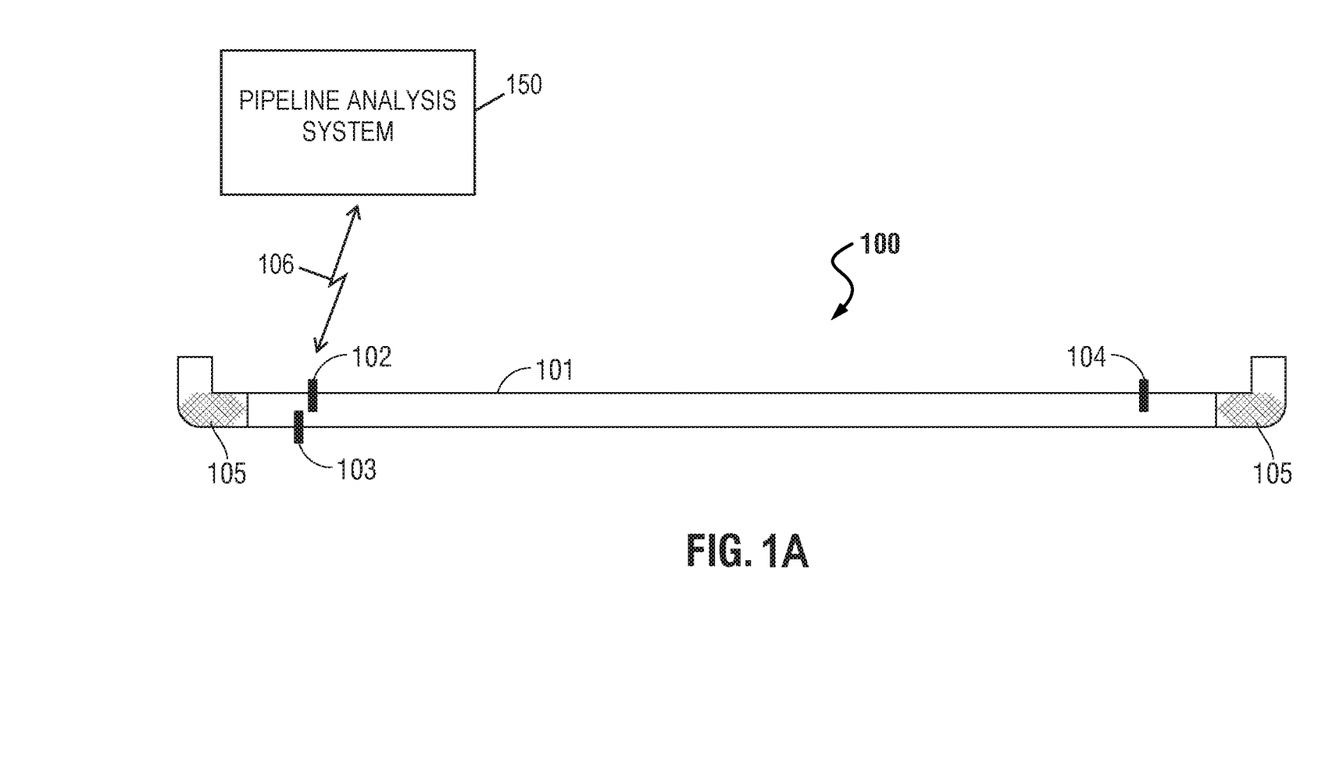
FIG. 1A shows an exemplary pipeline section which may be modeled according to embodiments of the disclosure.

FIG. 1A is a schematic diagram showing a portion of a pipeline 100 having an arrangement of components for which embodiments of the present disclosure may be used. The pipeline 100 includes a section of pipeline 101 having an acoustic source 102 arranged near one end (e.g., the left end). A first acoustic receiver 103, such as a hydrophone, is provided near the acoustic source 102 at the same end of the pipeline section 101. A second acoustic receiver 104, such as another hydrophone, is provided near the opposite end (e.g., the right end) of the pipeline section 101. It should of course be understood that any number of hydrophones may be employed along the pipeline section 101 without departing from the scope of the disclosed embodiments. Each end of the pipeline section 101 is provided with sound suppression material 105, such as reticulated foam or the like, for suppression of any extraneous sounds that may be present.

In operation, acoustic signals generated via acoustic source 102 are received at second hydrophone 104. Reflections of the acoustic signals are also received at first hydrophone 103. The hydrophones 103, 104 convert the acoustic signals, or rather the pressure changes resulting from the signals, into electrical signals and outputs the electrical signals. A data acquisition unit (not shown) coupled to the hydrophones 103, 104 receives the electrical signals, pre-processes them in a known manner (e.g., analog-to-digital conversion, filtering, smoothing, etc.), and sends the signals as data to a pipeline analysis system 150 for analysis. The data may be sent to the pipeline analysis system 150 over any suitable communication link, indicated at 106, including landline, cellular, satellite, and the like. The pipeline analysis system 150 then automatically analyzes the data to estimate or predict various parameters of the pipeline section 101 using an inversion process according to the present disclosure, as discussed herein.

Figure 1B:
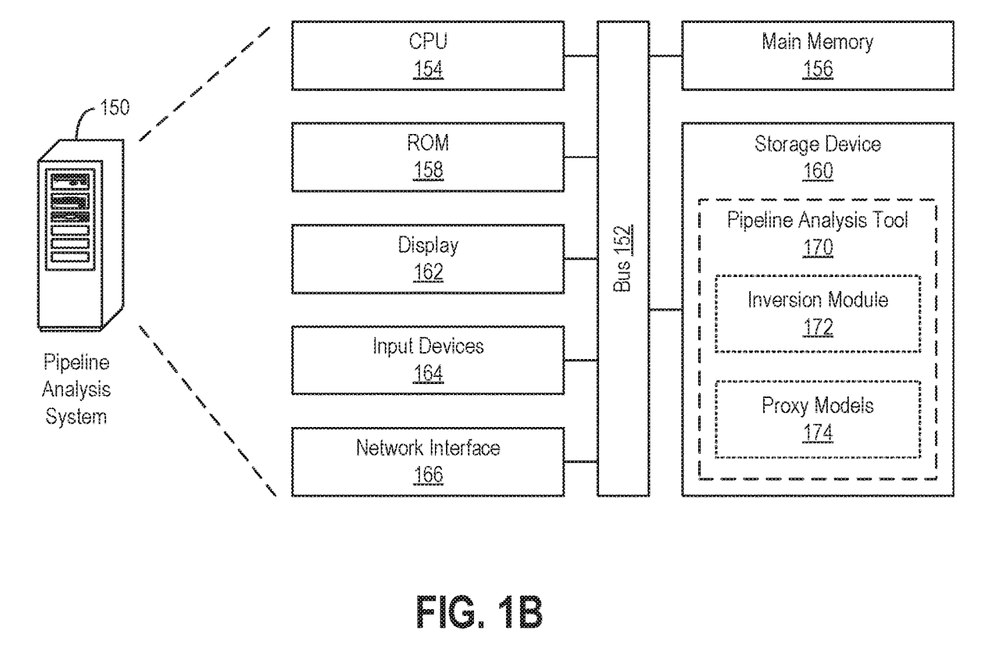
FIG. 1B shows an exemplary pipeline analysis system which may be used to model the pipeline section according to embodiments of the disclosure.

An exemplary implementation of the pipeline analysis system 150 is shown in FIG. 1B according to embodiments disclosed herein. The pipeline analysis system 150 may be a conventional computing system, such as a workstation, desktop, or laptop computer, or it may be a cloud-based computing system or an edge computing device. The pipeline analysis system 150 may also be a custom computing system developed for a particular application. Such a pipeline analysis system 150 may be located downhole, on the surface, or at a remote location, or a portion of the system 150 may be located downhole, a portion located on the surface, and/or a portion located at a remote location.

In a typical arrangement, pipeline analysis system 150 includes a bus 152 or other communication pathway for transferring information among other components within the system 150, and a CPU 154 coupled with the bus 152 for processing the information. The system 150 may also include a main memory 156, such as a random-access memory (RAM) or other dynamic storage device coupled to the bus 152 for storing computer-readable instructions to be executed by the CPU 154. The main memory 156 may also be used for storing temporary variables or other intermediate information during execution of the instructions by the CPU 154.

The system 150 may further include a read-only memory (ROM) 158 or other static storage device coupled to the bus 152 for storing static information and instructions for the CPU 154. A computer-readable storage device 160, such as a nonvolatile memory (e.g., flash memory) drive or magnetic disk, may be coupled to the bus 152 for storing information and instructions for the CPU 154. The CPU 154 may also be coupled via the bus 152 to a display 162 for displaying information to a user. One or more input devices 164, including alphanumeric and other keyboards, mouse, trackball, cursor direction keys, and so forth, may be coupled to the bus 152 for transferring information and command selections to the CPU 154. A communications interface 166 may be provided for allowing the system 150 to communicate with an external system or network.

The term "computer-readable instructions" as used above refers to any instructions that may be performed by the CPU 154 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device 160. Volatile media may include dynamic memory, such as main memory 156. Transmission media may include coaxial cables, copper wire and fiber optics, including the wires of the bus 152. Transmission itself may take the form of electromagnetic, acoustic or light waves, such as those generated for radio frequency (RF) and infrared (IR) data communications. Common forms of computer-readable media may include, for example, magnetic medium, optical medium, memory chip, and any other medium from which a computer can read.

In accordance with one or more disclosed embodiments, a pipeline analysis tool 170, or the computer-readable instructions therefor, may also reside on or be downloaded to the storage device 160 for execution. Such a pipeline analysis tool 170 may be a standalone tool or it may be integrated with other tools as part of an overall analysis software package. The pipeline analysis tool 170 may be implemented in any suitable computer programming language or software development package known to those having ordinary skill in the art, including various versions of Java, SAS, Python, C/C++/C#, R, SPSS, MATLAB, and the like.

In the FIG. 1B example, the pipeline analysis tool 170 comprises a number of components, including an inversion module 172 and one or more proxy models 174. As discussed later herein, the one or more proxy models 174 are hybrid models that combine statistical modeling with physics-based (i.e., empirical) modeling of a physical system, such as the pipeline system from FIG. 1A, and the inversion module 172 uses the outputs from these one or more proxy models 174 in an inversion process. The results of the pipeline analysis tool 170 may then be presented on the display 162 in a known manner. Such results may also be provided to remotely located technicians and operators through the network interface 166. Similarly, simulated and/or observed data representing acoustic signals may be provided to the pipeline analysis tool 170 via the input devices 164 and/or the network interface 166 for performing inversion analysis of such data.

Inversion is well understood by those skilled in the art and generally refers to the process of estimating or predicting the properties or parameters of a physical system, such as a pipeline system, based on the response of the system to a set of inputs. In the present case, the inputs are acoustic signals and the response of the physical system to the acoustic signals can be discerned from changes to the signals (e.g., frequency shifts, amplitude attenuations, etc.) as they propagate through the physical system. A model of the physical system is used to generate (i.e., calculate) values (i.e., data) that are then compared to observed values measured from an actual system. The model, typically called a forward model, is then refined and the process is repeated with the refined model parameters until the difference between model output and observed data are within a predefined error threshold (i.e., a statistical match or best fit). The model parameters that produce the statistical best fit are selected as the solution, or realization, for the model parameters.

Inversion processes can be broadly categorized as deterministic or stochastic. Deterministic inversion is based on a forward model in which a given set of model inputs will always produce the same model outputs. Thus, deterministic inversion tends to produce a single set of model parameters that satisfy the error threshold. Stochastic inversion is based on a forward model that incorporates uncertainty (i.e., inaccuracy, insufficiency, ambiguity, etc.) in the model inputs to produce a range of model outputs. To account for the uncertainty, probability density functions are determined and used for the model inputs, which produces several sets of solutions or realizations for the model parameters, each of which can satisfy the error threshold. Thus, stochastic inversion typically requires much more computational processing compared to deterministic inversion.

To reduce computational processing, the inversion module 172 applies a heuristic approach to the inversion process by employing a proxy model 174 that combines statistical modeling with physics-based (i.e., empirical) modeling of a physical system. In general, heuristics refers to a learning or problem solving approach that employs a practical method which, while not necessarily optimal, is sufficient for some immediate objective. Heuristic methods can be used to speed up the process of finding a satisfactory solution where an optimal solution may be impractical. Thus, the heuristic approach embodied in the inversion module 172 can find a solution or realization for model parameters more quickly compared to conventional stochastic inversion. The heuristic approach can additionally employ Bayesian modeling of uncertainty in model inputs and can further employ a GAN algorithm and statistical learning to achieve a more reliable point estimate of the desired model parameters. The above arrangement is particularly applicable to automatic inversion of physics-based forward models of pipelines, which can be particularly useful for leak detection in such pipelines.

Figure 2:
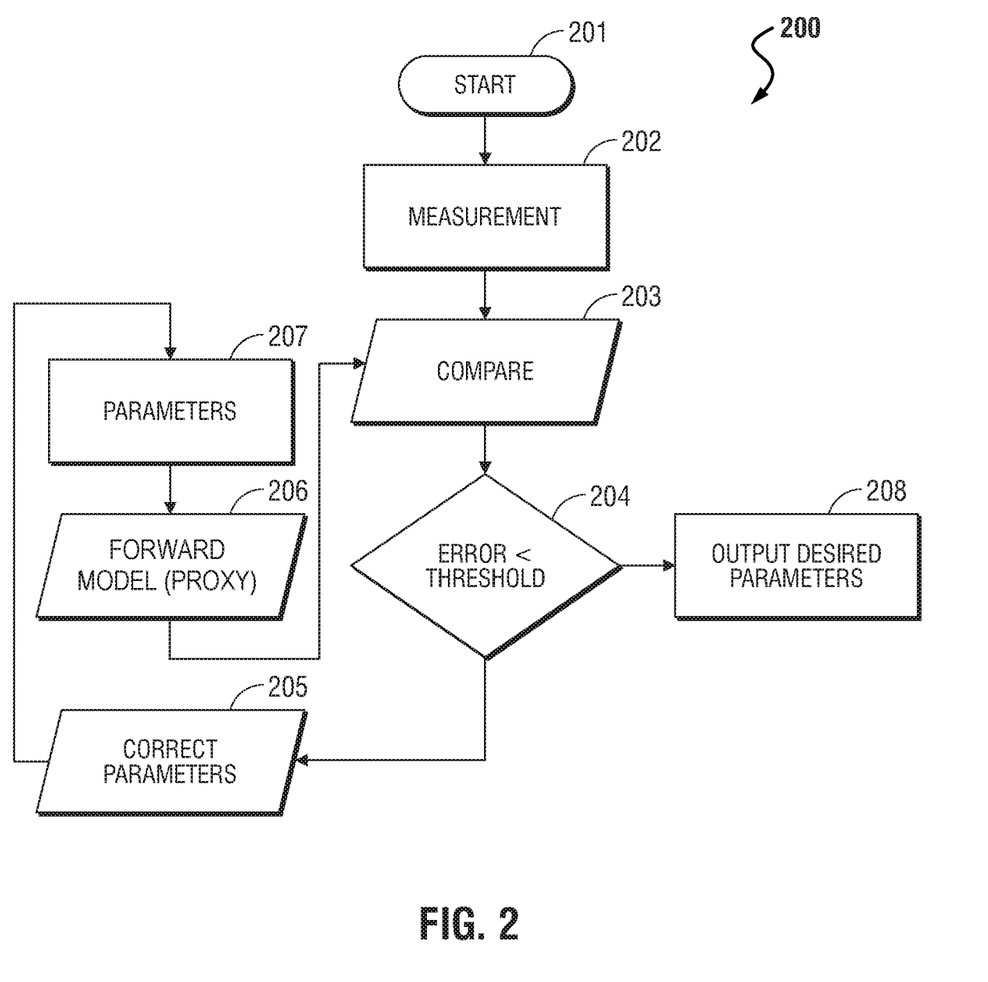
FIG. 2 shows a flowchart illustrating a workflow useful in embodiments of the disclosure.

An exemplary inversion process is shown in FIG. 2 that may be used by the inversion module 172. The figure shows in flow diagram form an inversion workflow 200 useful for estimating or predicting the parameters of a physical system, such as a pipeline. It will be understood by those having ordinary skill in the art that although the workflow 200 is described with respect to a pipeline, this workflow (or similar workflows) may also be applied to other types of physical systems.

Workflow 200 generally starts at block 201 where acoustic signals introduced into the pipeline by an acoustic generating source propagate through oil, gas, or other fluid in the pipeline. The workflow then proceeds to measurement block 202, where measurements of the acoustic signals are taken from the pipeline (or other physical system) under evaluation. For example, the measurement may involve measuring the reflected acoustic signals (i.e., echoes) returned from the acoustic signals that were propagated through the pipeline in block 201. The workflow then proceeds to block 203, where the measurements obtained at block 202 are compared to the projected measurements produced by a forward model of the pipeline, indicated at block 206.

The results of the comparison at block 203 is then provided to block 204 where an error or difference between the actual or observed measurements from block 202 and the results produced by the forward model at block 206 is determined. If the error or difference is below a predetermined threshold, meaning that the parameters of the forward model at block 206 have produced measurements that are a statistical match or best fit relative to the observed measurements, then workflow 200 proceeds to block 208, where these model parameters are outputted or otherwise set as the desired parameters to be used to analyze the pipeline. For example, these parameters may indicate whether there are leaks in the pipeline, whether there are deposits or accumulations on an inner surface of the pipeline, and the like.

However, if the error or difference exceeds the predetermined threshold, then workflow 200 proceeds to block 205 where the model parameters are corrected, adjusted, or otherwise refined in a known manner. At block 207, the corrected parameters become the new parameters for the forward model at block 206 and the workflow 200 is repeated. This process continues for a number of iterations until the parameters for the forward model have been determined such that the error falls below a predetermined threshold.

According to embodiments of the disclosure, the forward model depicted in block 206 is not a deterministic model in which the output of the model is fully determined by the input parameters and initial conditions. Preferably, the forward model in block 206 is a stochastic model in which a statistical model is combined with a physics-based (i.e., empirical) model to form a hybrid statistical/physics-based model. Such a stochastic forward model incorporates or otherwise accounts for uncertainty in the input parameters, indicated at block 207. These input parameters include estimates and approximations of the physical characteristics and conditions expected to be present in the pipeline, including pipe diameter, thickness, length, elevation and geometry, and the properties of the fluid/gas flowing through the pipeline system, such as the density, viscosity, and acoustic velocity.

In the exemplary workflow 200, the forward model at block 206 may be a model that simulates a plane-wave acoustic 1-D model in a pipeline with changing cross-sectional area (e.g., due to deposits on the pipeline inner surface). This forward model may be described by a complex value function F, such that:

$$F: e^{jkx} \rightarrow R_1 e^{-jkx} e^{-\alpha_1(x_1-x)f}$$

For the above complex value function, x is the coordinate along the length of the pipeline, k is a wave number, $R_1$ is the reflection coefficient attributed to changes in the pipeline cross-section, a is the attenuation coefficient (usually in dB/m/Hz), and f is the frequency of the acoustic signal. Higher dimensional models may of course be used within the scope of the present disclosure.

In some embodiments, the above forward model uses a complex value loss function E. A loss function, in general, is a function that is used in parameter estimation to determine the difference between values estimated by a model and observed values. For deterministic inputs (i.e., where uncertainty is not accounted for) provided to the forward model, the complex value loss function E may be defined as shown in equation (1), where P is the set of model parameters for which a solution or realization is sought. For a lower order computation of the parameter solution, equation (3) can be used, where n is an iteration number and ϕ represents a gradient of the complex value loss function E, as expressed in equation (2). The gradient ϕ is similar to gradients of loss function used in gradient descent methods to compute changes in the parameters P. For a higher order parameter solution, equation (4) may be used, where n is again the iteration number and α is a factor used to adjust the rate of convergence. Equation (4) assumes a Hessian matrix will be computed. The Hessian matrix can be quite time-consuming, however, so a Jacobian matrix may be obtained instead in some embodiments.

$$E = f(P) \tag{1}$$

$$\phi = -\nabla E \tag{2}$$

$$\overline{P}_{n+1} = \overline{P}_n - \alpha\phi \tag{3}$$

$$\overline{P}_{n+1} = \overline{P}_n - \nabla\phi \tag{4}$$

To account for uncertainty in the model inputs, a prior PDF (probability distribution function) D may be obtained, for example, using equation (5), where x is a given model input and θ is a given model parameter, while i indicates an iteration number from 1 to N. It can then be seen from equation (6) that the complex value loss function E combines several D's to obtain a joint PDF π that contains several model parameters in the set of model parameters P to be determined using a gradient descent method.

$$D = [(x_i, \theta_i) | i \in 1, 2 \ldots N] \tag{5}$$

$$E = (\pi(D), P) \tag{6}$$

Figure 3:
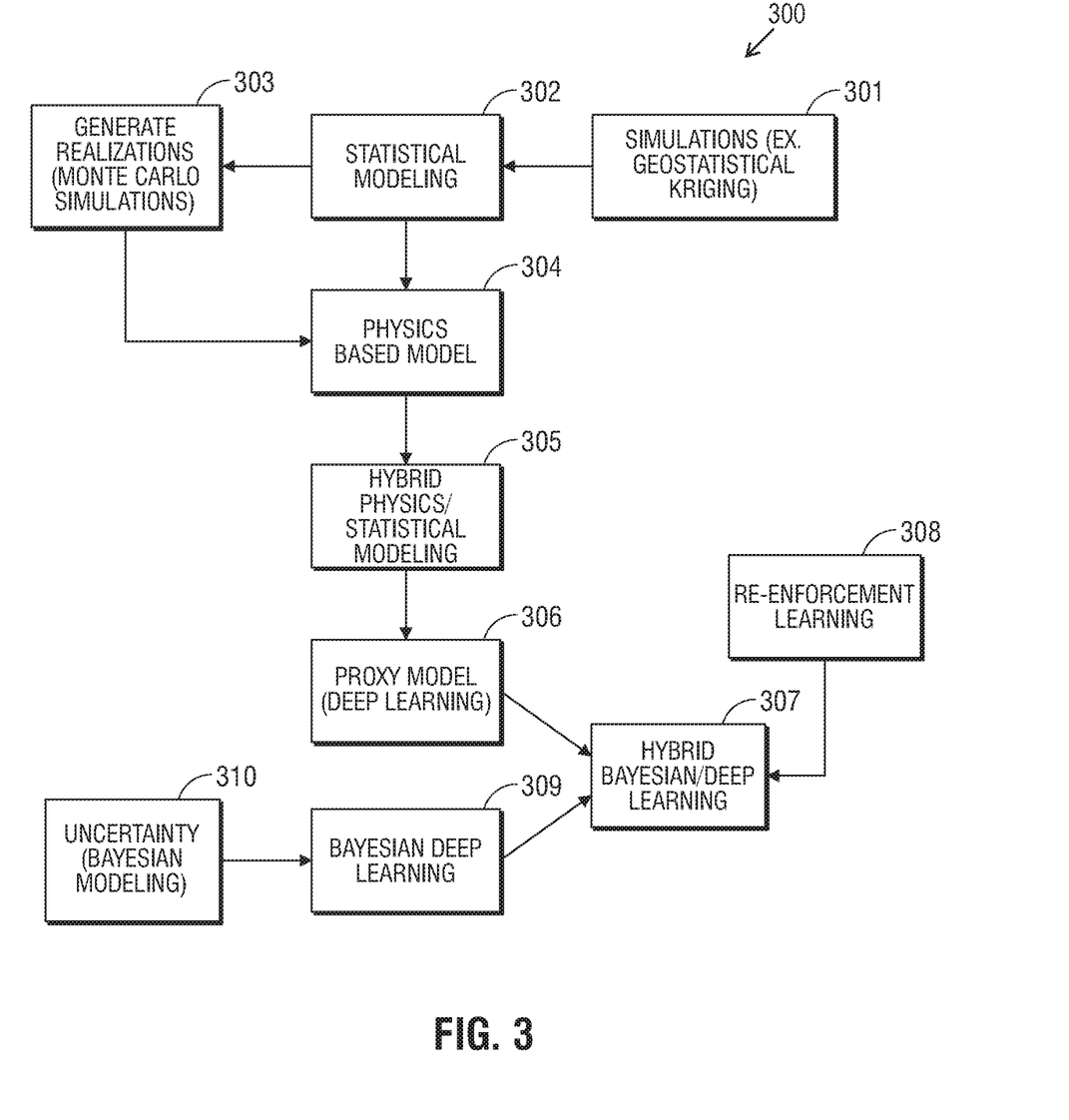
FIG. 3 shows a deep neural network useful in embodiments of the disclosure.

FIG. 3 shows a flow diagram illustrating a workflow 300 that may be used to develop a forward model that incorporates or otherwise accounts for uncertainty in accordance with the present disclosure. As alluded to above, the workflow 300 combines the results of statistical modeling with the results of physical or physics-based empirical modeling to produce a deep learning model. In some embodiments, the deep learning model is combined with Bayesian modeling to create a hybrid Bayesian/deep learning model that minimizes the uncertainty. In some embodiments, the hybrid Bayesian/deep learning model is further improved and/or modified through the use of re-enforcement learning (RL) that work a preference for certain actions or results into the deep learning model.

The workflow 300 generally begins at block 301 where simulations of the pipeline (or other physical system) under consideration are performed to generate an initial set of data representing the pipeline. This data set may be comprised of data from laboratory simulations of the pipeline or from actual measurements from field equipment. The data set may also be comprised of data from simulations using other known techniques, for example, such as geostatistical Kriging, a form of geostatistical interpolation that is known to those of skill in the art. At block 302, statistical modeling is performed on the data resulting the simulations from block 301 to derive one or more models that approximate the results of the simulation. These statistical models may include one or more mathematical relationships or equations that approximate the results of the simulation from block 301.

At block 303, one more solutions, or realizations, are generated from the data set and the statistical models from blocks 301 and 302 using, for example, Monte Carlo simulations. Monte Carlo simulation is a well-known technique for estimating the most probable outcomes from a model with uncertain input data and to estimate the validity of the simulated model. The technique is particularly useful when the data set does not follow known statistical distributions for the data. In this case, the Monte Carlo simulations performed at block 303 may be used to determine the likelihood function for the probability distribution of the statistical models.

In parallel with block 303, the workflow 300 proceeds from block 302 to block 304, where a physics-based model of the pipeline (or other physical system) is obtained or otherwise defined. The physics-based model is typically a deterministic model that simulates the pipeline (or other physical system) according to the physical properties and characteristics of the pipeline, such as pipe diameter, thickness, length, elevation and geometry, and the properties of the fluids flowing through the pipeline, such as the density, viscosity, and velocity of sound traveling through the fluids. Various approaches to such physical modeling of the pipeline are known to those of skill in the art, and may be used in embodiments of the disclosure.

At block 305, hybrid physical/statistical modeling is performed using the statistical models from block 302, the realizations generated at block 303, and the physics-based model from block 304. This hybrid physical/statistical modeling merges or joins the statistical models with the physics-based model in a known manner (i.e., combines similar or overlapping parameters, adds dissimilar or non-overlapping parameters, etc.). The result is one or more mathematical relationships or equations that represent a hybrid physical/statistical model of the pipeline.

At block 306, the hybrid physical/statistical model is used to set up a deep learning model. The deep learning model is preferably implemented as a deep neural network (DNN) (i.e., a neural network having two or more layers between input and output). In some embodiments, data derived from the hybrid physics/statistical modeling at block 305 may be used as training data for the deep learning model. The deep learning model may then be used in an inversion process (e.g., workflow 200 of FIG. 2) as a proxy for the forward model (e.g., block 206) of the pipeline to provide predicted or estimated values for comparison (e.g., block 203) to observed values. The inversion workflow (e.g., workflow 200) is then iteratively performed until the pipeline is accurately modeled within a predefined error threshold.

In some embodiments, the deep learning proxy of the forward model is operated using, or in conjunction with, a generative adversarial network (GAN) framework. In a GAN, in general, a generative network generates output from training data, and a discriminative network tries to distinguish between the output and the training data.

In some embodiments, the deep learning proxy model in block 306 is further improved by employing Bayesian modeling to account for uncertainty in the model inputs. In such embodiments, uncertainty in the model inputs is incorporated or otherwise accounted for through Bayesian modeling at block 310, for example, by the use of Bayes' rule to determine a probability distribution function (PDF) for the proxy model inputs. At block 309, Bayesian deep learning is performed using the proxy model and PDF determined in block 310. This Bayesian deep learning, in general, adds a prior distribution over the weights and bias parameters in the proxy model. The result is a hybrid Bayesian deep learning proxy model, indicated at block 307, that may be used as a proxy for the forward model in an inversion process (e.g., workflow 200 of FIG. 2).

In some embodiments, the Bayesian modeling at block 310 is performed using, or in conjunction with, a GAN framework to model the uncertainty. In other embodiments, the Bayesian modeling at block 310 is performed using, or in conjunction with, a deep belief network ("DBN") to model the uncertainty. A DBN is a well-known type of deep neural network composed of multiple layers of latent ("hidden") variables or units that, when trained, can learn to probabilistically reconstruct its inputs. In some embodiments, the hybrid Bayesian/deep learning model in block 307 may be further improved by implementing re-enforcement learning (RL), indicated at block 308, which refers to a well-known type of machine learning (ML) in which a software or algorithm is taught to take actions that maximize a particular return or result (i.e., a reward). Data for the re-enforcement learning at block 308 may come from measurements taken of the physical system, such as the one described with respect to FIG. 1. The output of the hybrid Bayesian/deep learning model in block 307 is then employed in an inversion process, such the workflow 200 in FIG. 2, for comparison with observed values, such as at block 203. Iterations of the inversion process are performed until the desired accuracy of the model is achieved.

Figure 4:
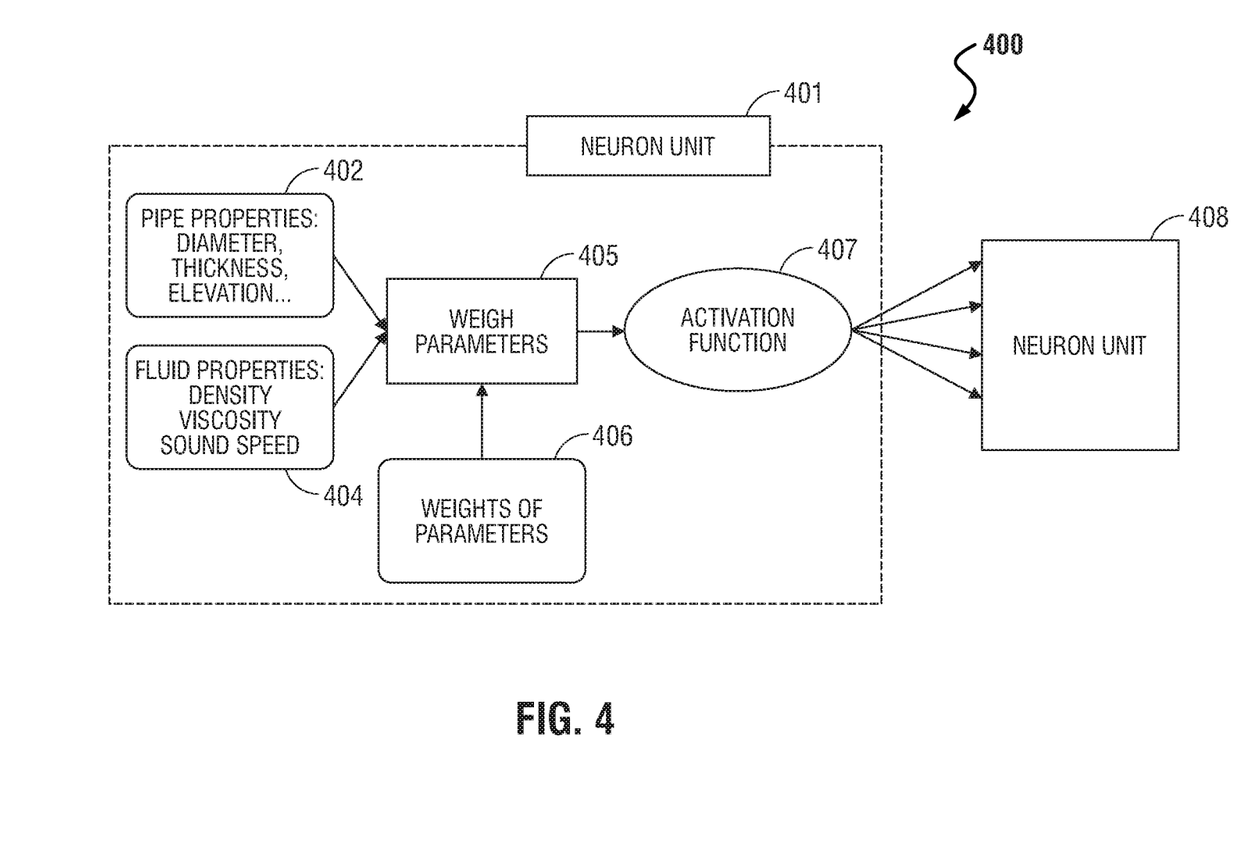
FIG. 4 shows a flowchart illustrating a workflow according to an embodiment of the disclosure.

FIG. 4 shows a block diagram of an exemplary DNN architecture 400 that may be used to facilitate the deep learning performed at block 306. As alluded to above, according to embodiments of the invention, instead of a conventional physics-based model, a multi-layer perceptron architecture with feedback may be used to learn the relationship between the parameters of interest and the simulations/measurements of those parameters.

In the example, the DNN architecture 400 includes a plurality of neuron units, one of which is indicated at 401. It will be understood by those of skill in the art that neuron unit 401 is further comprised of a layer of artificial neurons, which may provide individual weighing of parameters for each data input that is provided as an input to the neuron unit. The neuron unit 401 may comprise any number of artificial neurons in each layer. According to embodiments of the disclosure, multiple architectures may be used for the arrangement of neurons in the neural network, including semi or full connectivity in the hidden layers.

Inputs to the neuron unit 401 include data representing the physical properties found in the pipeline. For example, in block 402, the neuron unit 401 is provided with properties about the physical pipeline itself, such as inner diameter, thickness, and elevation. In block 404, the neuron unit 401 is provided with data concerning the properties of the fluids flowing through the pipeline, such as fluid density, viscosity, and acoustic velocity. The parameters provided as input in blocks 402 and 404 are assigned various weights as depicted in block 406 to be applied to the parameters in the learning process. These weights are applied to the various physical properties of the pipeline at block 405 to appropriately weigh the parameters before they are provided to an activation function at block 407.

In general, the activation function of a neuron unit defines the output of that neuron unit, or "neuron," for a given input or set of inputs. The output is then used as an input for the next neuron unit, and so on until a desired solution to the original problem is found. The choice of activation functions is important to achieve accurate results and the present disclosure is useful with a wide range of functions. In the exemplary case of deposition forward modeling of pipelines using acoustic signals, useful activation functions include Exponential activation functions (which are particularly useful when dealing with acoustic waves), Linear activation functions, and Rectified Linear Units ("RELU") activation functions.

Multiple neuron units are connected to each other in some embodiments of the architecture 400. For example, FIG. 4 shows neuron unit 401 connected to neuron unit 408. However, it will be appreciated that any number of neuron units may be connected together as a matter of design choice.

In one particular embodiment, five neuron units are provided with the following activation functions, with the first four in the following order: Linear to RELU to Linear to RELU. Other architectures, however, with different combinations of Exponential, Linear and RELU can also be used in other embodiments of the disclosure. Still further architectures may be used as a matter of design choice.

In some embodiments, the final neuron unit in the DNN architecture 400 may have a loss function as an output. The loss function, as discussed earlier, indicates the closeness of the DNN output to the physics-based simulation. Suitable loss functions that may be used as the output of the final neuron unit in the DNN architecture 400 include Softmax and Cross-Entropy loss functions, both of which are well known to those skilled in the art.

Figure 5:
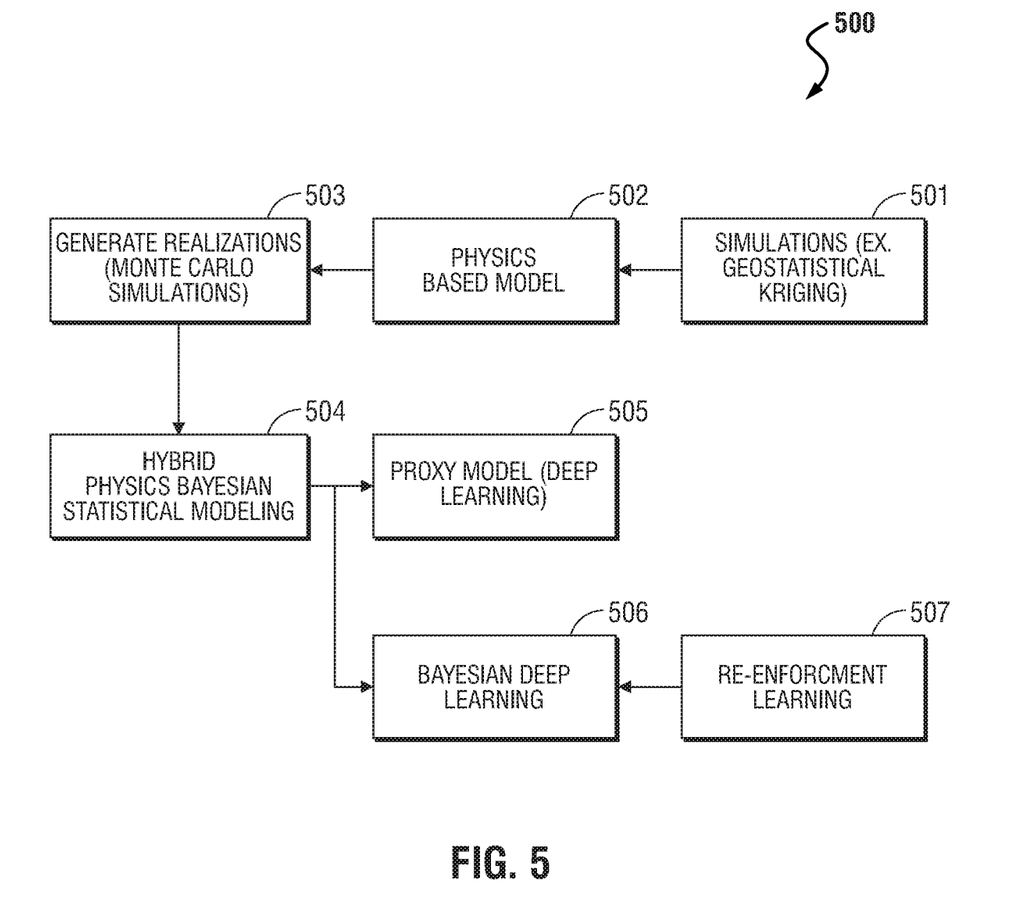
FIG. 5 shows a flowchart illustrating a workflow according to a further embodiment of the disclosure. Change in pipeline diameter, acoustic velocity, thickness of various layers, density of various layers.

Following now in FIG. 5 is another exemplary workflow 500 useful in an inversion process according to a further embodiment of the present disclosure. The workflow 500 is similar to the workflow 300 discussed with respect to FIG. 3, except that the sequence of operations is somewhat different. Workflow 500 begins at block 501 with simulations of a physical system, for example, a pipeline. At block 502, the simulations are used to compose a physics-based model of the pipeline. At block 503, realizations of the model parameters are generated, for example, using Monte Carlo simulations. The simulations obtained in block 503 are similar to those discussed with respect to block 303 in FIG. 3. Further, the physics-based model obtained at block 502 correspond to the physics-based model obtained at block 304 in FIG. 3, and likewise the simulations obtained at block 501 correspond to the simulations obtained at block 301 in FIG. 3. At block 504, hybrid physics/Bayesian statistical modeling is performed using the realizations obtained at block 503. As explained earlier, Bayesian statistical modeling incorporates or otherwise account for uncertainty in the model inputs. The result is one or more mathematical relationships or equations that represent a hybrid physics/Bayesian statistical model of the pipeline.

At block 506, the hybrid physics/Bayesian statistical model is used or implemented as a deep learning proxy model. The deep learning proxy model is again preferably implemented as a deep neural network (DNN) in a manner similar to that described above FIG. 3. The deep learning proxy model may then be employed in an inversion process (e.g., workflow 200 of FIG. 2) as a proxy for the forward model (e.g., block 206) of the pipeline to provide predicted or estimated values for comparison (e.g., block 203) to observed values.

Bayesian deep learning may be performed at block 506 in a manner similar to that described with respect to block 309 of FIG. 3 in some embodiments. In some embodiments, re-enforcement learning (RL) may be performed at block 507 in a manner similar to that described with respect to block 308 of FIG. 3.

As can be seen, the above descriptions of various embodiments herein can apply to a large class of inversion problems. In a more specific embodiment, a modeling method and system according to the present disclosure may be applied to the problem of depositions (i.e., accumulations) in pipelines, and an inversion model according to the present disclosure may be used to estimate the depositions using measurements of pressure (or changes thereof) in the pipeline resulting from either acoustics or hydrodynamics.

It will also be understood that the forward model may in general be expressed as a function that maps parameters such as pipe geometry, fluid properties and the initial source pulse to the measured time series of acoustic pressure. A physics-based forward model useful in embodiments of the disclosure may be constructed by either solving for hydrodynamic equations or the acoustic wave equations that describe acoustic wave propagation in the pipeline system in the presence of internal diameter changes in the pipeline. However, computer analysis of such a forward model may be time consuming. Therefore, in other embodiments of the disclosure, a proxy model may be used to decrease computer processing time.

Embodiments of the disclosure, as discussed above, also account for uncertainty in parameter realization. According to embodiments of the disclosure, a statistical learning models may be used to produce high-quality real-time solutions. Generative models may be used to extrapolate $\hat{x}_i$, $\hat{\theta}_i$ such that the joint PDF (probability density function) of $\hat{x}_i$, $\hat{\theta}_i$ follows the density function of $x_i$, $\theta_i$ (see equations 1-6). An inversion process may then be performed, for example, by a deep belief network (DBN) in real time estimating the regression function $G: X \rightarrow \theta$.

Models trained as disclosed herein may be deployed as real-time production models that generate inversion solutions applicable to any well posed problem in the class of problems to which the exemplary pipeline problem discussed herein belong. It will also be understood by those of skill in the art that a neural network architecture may be used to determine the accuracy of the models.

In general, in one aspect, embodiments of the present closure relate to a system for analyzing a section of a pipeline using acoustic signals. The system comprises, among other things, a display unit, a processor connected to the display unit, and a storage device connected to the processor. The storage device stores instructions that, when executed by the processor, cause the system to perform operations comprising receiving acoustic data representing an acoustic signal generated by an acoustic signal generating source operable to generate an acoustic signal within the section of the pipeline and inputting the acoustic data into a pipeline analysis tool. The instructions further cause the system to create a deep learning proxy model of the section of the pipeline using the pipeline analysis tool, and perform an inversion analysis of parameters for a forward model of the pipeline using the deep learning proxy model created by the pipeline analysis tool.

In one or more of the foregoing embodiments, the instructions cause the system to perform an inversion analysis by performing a hybrid physics-based modeling of the section of the pipeline and a statistical modeling of the section of the pipeline, and generate Monte Carlo realizations of model parameters for the physics-based modeling.

In one or more of the foregoing embodiments, the instructions cause the system to perform an inversion analysis by accounting for uncertainty in one or more inputs to the deep learning proxy model using Bayesian modeling, performing Bayesian deep learning using the uncertainty from the Bayesian modeling, and employing re-enforcement learning (RL) in conjunction with the Bayesian deep learning.

In general, in another aspect, embodiments of the present disclosure relate to an apparatus for use in an oil and gas pipeline. The apparatus comprises, among other things, at least one acoustic signal generating source that propagates an acoustic signal into the pipeline and at least one acoustic signal receiver that receives signals from the pipeline, the reflected signals comprising reflections of the at least one acoustic signal generated by the at least one acoustic signal generating source. The apparatus further comprises a pipeline analysis system operable to receive electrical signals from the at least one acoustic signal receiver, the electrical signals being received by the pipeline analysis system as acoustic data. The pipeline analysis system is operable to perform an inversion analysis of parameters for a forward model of the pipeline using a deep learning proxy model in real time using the reflected signals received by the at least one acoustic signal receiver.

In one or more of the foregoing embodiments, the pipeline analysis system is further operable to perform a hybrid physics-based modeling of the pipeline and a statistical modeling of the pipeline, and generate Monte Carlo realizations of model parameters for the physics-based modeling.

In one or more of the foregoing embodiments, the pipeline analysis system is further operable to account for uncertainty in one or more inputs to the deep learning proxy model using Bayesian modeling, perform Bayesian deep learning using the uncertainty from the Bayesian modeling, and employ re-enforcement learning (RL) in conjunction with the Bayesian deep learning.

In general, in yet another aspect, embodiments of the present disclosure relate to a method for determining the condition of a pipeline using acoustic signals. The method comprises, among other things, generating acoustic signals within the pipeline using an acoustic signal generating source and receiving reflected signals using an acoustic signal receiver, the reflected signals representing reflections of the acoustic signals generated within the pipeline the method further comprises creating a deep learning proxy model of the pipeline using the acoustic signals and the reflected signals, and performing an inversion analysis of parameters for a forward model of the pipeline using the deep learning proxy model.

In one or more of the foregoing embodiments, performing an inversion analysis comprises performing a hybrid physics-based modeling of the section of the pipeline and a statistical modeling of the section of the pipeline, and generating Monte Carlo realizations of model parameters for the physics-based modeling.

In one or more of the foregoing embodiments, performing an inversion analysis further comprises accounting for uncertainty in one or more inputs to the deep learning proxy model using Bayesian modeling, performing Bayesian deep learning using the uncertainty from the Bayesian modeling, and employing re-enforcement learning (RL) in conjunction with the Bayesian deep learning.

In one or more of the foregoing embodiments, the method uses a deep neural network to implement a physics-based model and a statistical model of the pipeline, and uses a deep neural network to implement the deep learning proxy model.

While the invention has been described with reference to one or more particular embodiments, those skilled in the art will recognize that many changes may be made thereto without departing from the spirit and scope of the description. Each of these embodiments and obvious variations thereof is contemplated as falling within the spirit and scope of the claimed invention, which is set forth in the following claims.

What is claimed is:

1. A system for analyzing a section of a pipeline using acoustic signals, the system comprising:
at least one acoustic signal generating source that propagates an acoustic signal into the pipeline;
at least one acoustic signal receiver that receives signals from the pipeline, the signals comprising reflections of the at least one acoustic signal generated by the at least one acoustic signal generating source;
a display unit;
a processor connected to the display unit; and
a storage device connected to the processor, the storage device storing instructions thereon that, when executed by the processor, cause the system to perform operations comprising:
receiving acoustic data from the at least one acoustic signal receiver, the acoustic data representing the acoustic signal generated by the at least one acoustic signal generating source operable to generate the acoustic signal within the section of the pipeline;
inputting the acoustic data into a pipeline analysis tool;
creating a deep learning proxy model of the section of the pipeline using the pipeline analysis tool, wherein:
the deep learning proxy model is usable to simulate a plane-wave acoustic 1-D model in the pipeline; and
the deep learning proxy model is a combination of a statistical model and a physics-based model of the pipeline; and
performing an inversion analysis of parameters for a forward model of the pipeline using the deep learning proxy model created by the pipeline analysis tool.

2. A system as in claim 1, wherein the instructions cause the system to perform an inversion analysis by performing a hybrid physics-based modeling of the section of the pipeline and a statistical modeling of the section of the pipeline.

3. A system as in claim 2, wherein the instructions cause the system to generate Monte Carlo realizations of model parameters for the physics-based modeling.

4. A system as in claim 1, wherein the instructions cause the system to perform an inversion analysis by accounting for uncertainty in one or more inputs to the deep learning proxy model using Bayesian modeling.

5. A system as in claim 4, wherein the instructions cause the system to perform an inversion analysis by performing Bayesian deep learning using the uncertainty from the Bayesian modeling.

6. A system as in claim 5, wherein the instructions cause the system to perform an inversion analysis by employing re-enforcement learning (RL) in conjunction with the Bayesian deep learning.

7. An apparatus for use in an oil and gas pipeline, the apparatus comprising:
   at least one acoustic signal generating source that propagates an acoustic signal into the pipeline;
   at least one acoustic signal receiver that receives signals from the pipeline, the signals comprising reflections of the at least one acoustic signal generated by the at least one acoustic signal generating source; and
   a pipeline analysis system operable to receive electrical signals from the at least one acoustic signal receiver, the electrical signals being received by the pipeline analysis system as acoustic data;
   where the pipeline analysis system is operable to perform an inversion analysis of parameters for a forward model of the pipeline using a deep learning proxy model in real time using the signals received by the at least one acoustic signal receiver, wherein:
      the deep learning proxy model is usable to simulate a plane-wave acoustic 1-D model in the pipeline; and
      the deep learning proxy model is a combination of a statistical model and a physics-based model of the pipeline.

8. An apparatus as in claim 7, wherein the pipeline analysis system is further operable to perform a hybrid physics-based modeling of the pipeline and a statistical modeling of the pipeline.

9. An apparatus as in claim 8, wherein the pipeline analysis system is further operable to generate Monte Carlo realizations of model parameters for the physics-based modeling.

10. An apparatus as in claim 7, wherein the pipeline analysis system is further operable to account for uncertainty in one or more inputs to the deep learning proxy model using Bayesian modeling.

11. An apparatus as in claim 10, wherein the pipeline analysis system is further operable to perform Bayesian deep learning using the uncertainty from the Bayesian modeling.

12. An apparatus as in claim 11, wherein the pipeline analysis system is further operable to employ re-enforcement learning (RL) in conjunction with the Bayesian deep learning.

13. A method for determining condition of a pipeline using acoustic signals, the method comprising:
   generating acoustic signals within the pipeline using an acoustic signal generating source;
   receiving reflected signals using an acoustic signal receiver, the reflected signals representing reflections of the acoustic signals generated within the pipeline;
   creating a deep learning proxy model of the pipeline using the acoustic signals and the reflected signals, wherein:
      the deep learning proxy model is used to simulate a plane-wave acoustic 1-D model in the pipeline; and
      the deep learning proxy model is a combination of a statistical model and a physics-based model of the pipeline; and
   performing an inversion analysis of parameters for a forward model of the pipeline using the deep learning proxy model.

14. A method as in claim 13, wherein performing an inversion analysis comprises performing a hybrid physics-based modeling of a section of the pipeline and a statistical modeling of the section of the pipeline.

15. A method as in claim 14, wherein performing an inversion analysis further comprises generating Monte Carlo realizations of model parameters for the physics-based modeling.

16. A method as in claim 13, wherein performing an inversion analysis further comprises accounting for uncertainty in one or more inputs to the deep learning proxy model using Bayesian modeling.

17. A method as in claim 16, wherein performing an inversion analysis further comprises performing Bayesian deep learning using the uncertainty from the Bayesian modeling.

18. A method as in claim 17, wherein performing an inversion analysis further comprises employing re-enforcement learning (RL) in conjunction with the Bayesian deep learning.

19. A method as in claim 13, further comprising using a deep neural network to implement a physics-based model and a statistical model of the pipeline.

20. A method as in claim 13, further comprising using a deep neural network to implement the deep learning proxy model.

* * * * *